United States Patent [19]

Hammonds

[11] 4,333,666
[45] Jun. 8, 1982

[54] HITCH HEAD HAVING INTERLOCKING JAW MECHANISM

[75] Inventor: James C. Hammonds, St. Charles, Mo.

[73] Assignee: ACF Industries, Incorporated, New York, N.Y.

[21] Appl. No.: 158,962

[22] Filed: Jun. 12, 1980

[51] Int. Cl.³ .................... B62D 53/08; B62D 53/10; B62D 53/12
[52] U.S. Cl. .................................................. 280/435
[58] Field of Search .............. 280/435, 436, 437, 508, 280/434

[56] References Cited

U.S. PATENT DOCUMENTS

| | | | |
|---|---|---|---|
| 3,632,145 | 1/1972 | Davis et al. | 410/64 |
| 3,870,342 | 3/1975 | Baxter et al. | 280/433 |
| 4,213,590 | 7/1980 | Van Dyke | 410/64 |
| 4,221,397 | 9/1980 | Holt | 280/436 |
| 4,225,276 | 9/1980 | Stoller et al. | 280/436 |

Primary Examiner—Joseph Paul Brust
Attorney, Agent, or Firm—Henry W. Cummings

[57] ABSTRACT

A hitch head or fifth wheel is provided including a pair of pivotable jaws which hold in place a kingpin of a highway trailer. A horizontally movable lock block, biased by a stiff spring to closed position, engages the jaws and holds them in closed position, maintaining the kingpin in place. The lock block is movable to an open position by a finger extending through an opening in the lock block. The finger is movable to an overcenter position which allows the lock block to move to a position engaging the rear portion of the jaws, holding the jaws open until another kingpin enters the jaws and pivots the jaws to closed position. The front portion of the lock block is provided with a cam surface. If a first jaw begins to move to closed position and the other jaw does not, the first jaw will move the lock block rearwardly and a lock block cam surface protrusion will engage the finger and pivot the finger whereby the finger will engage a rear external surface of the other jaw. This prevents further movement of the first jaw toward the closed position. Alternatively, the first jaw will engage the finger to pivot the finger to engage the other jaw. This prevents further movement of the first jaw toward closed position.

17 Claims, 7 Drawing Figures

4,333,666

HITCH HEAD HAVING INTERLOCKING JAW MECHANISM

BACKGROUND OF THE INVENTION

In previous hitch head or fifth wheel constructions, it has been common to provide a pair of rotatable jaws which in closed position hold in place the kingpin of a highway trailer, and which are biased to assume an open position allowing removal of the kingpin by a pair of torsion springs attached respectively to each of the jaws. The torsion springs tend to prevent the jaws from moving to the closed position without the presence of a kingpin to force the motion.

However, it has been found that in service the torsion springs occasionally become inoperative or break, requiring that the hitch be taken out of revenue service and be dismantled to replace the broken or inoperative torsion springs.

If the torsion springs are not replaced and the hitch remains in service, there is a danger that one jaw will return to closed position and prevent entry of the kingpin.

SUMMARY OF THE INVENTION

The object of the present invention is to provide a hitch head including a pair of rotatable jaws and means to prevent the jaws from assuming a closed position without the insertion of a kingpin once they have been moved to an open position.

A hitch head or fifth wheel is provided including a pair of pivotable jaws which hold in place a kingpin of a highway trailer. A horizontally movable lock block, biased by a stiff spring to closed position, engages the jaws and holds them in closed position, maintaining the kingpin in place. The lock block is movable to an open position by a finger which engages the lock block. The finger is rigidly attached to a horizontally extending operating shaft which is rotatable by a handle to move the finger to an overcenter position holding the lock block in open position. The finger includes a transversely extending protrusion which is engaged by the jaws as a kingpin exits to pivot the finger from the overcenter position and allow the lock block to move to a position engaging the rear portion of the jaws, holding the jaws open until another kingpin enters the jaws and pivots the jaws to closed position.

In accordance with the present invention, the front portion of the lock block is provided with a cam surface. If a first jaw begins to move to closed position and a second jaw does not, the first jaw will force the lock block cam surface to engage a protrusion on the finger and pivot the finger whereby a second protrusion on the finger will engage a rear external surface of the second jaw. This prevents a further movement of the first jaw toward the closed position.

In an alternative the moving jaw engages the first finger protrusion to pivot the finger and cause the second finger protrusion to engage to the other jaw and pivot it from moving toward open position. In this arrangement a front slot is conveniently provided in the lock block to allow the moving jaw to engage the finger.

THE DRAWINGS

DESCRIPTION OF PREFERRED EMBODIMENTS

Figure 3:
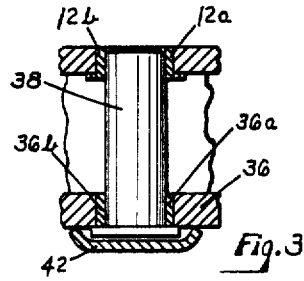
FIG. 3 is a vertical sectional view looking in the direction of the arrows 3—3 in FIG. 1 illustrating the jaw pins.

In a hitch head or fifth wheel 10, a longitudinally extending top plate 12 includes a plurality of depending webs 14,16,18,19,20,21,22 and 24. Top plate 12 includes an opening 30 defined by a pair of inclined gathering surfaces 32 and 34 adapted to guide the kingpin of a highway trailer into engaged position with the hitch head. A bottom plate 36 is located inwardly of the gathering surfaces 32 and 34, and a pair of jaw pins 38 and 40 are mounted in openings 12a and 36a as indicated in FIG. 3. Suitable bushings 12b and 36b are also provided for the jaw pins, and a lower closure plate 42 is also provided for each of the jaw pins.

Jaws 44 and 46 are rotably mounted about the jaw pins 38 and 40. Each of the jaws 44 and 46 include front tapered surfaces 48 and 50, abutting portions 52 and 54, and arcuate kingpin engagement portions 56 and 58. The jaws further include body portions 60 and 62 surrounding jaw pins 38 and 40 and first rear tapered surfaces 64 and 66. Each of the jaws include inwardly extending second tapered surfaces 68 and 70 and lugs 72 and 74 are defined at the juncture of tapered surfaces 66 and 70 and 64 and 68. The jaws further include transverse vertical surfaces 76 and 78 and inclined vertical surfaces 80 and 82 which join arcuate jaw portions 56 and 58.

Figure 5:
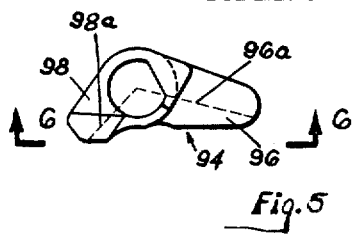
FIG. 5 is a detail view of the finger utilized in the jaw interlock arrangement of the present invention.

A lock block 84 is generally rectangular; however, it includes side vertical tapered surfaces 86 and 88 which cooperate with tapered surfaces 68 and 70 on the jaws. Side tapered surfaces include tapered portions 87 and 89 which are tapered away from surfaces 68 and 70 on the jaws. A shaft 90 extends transversely of the head through vertical walls 20, 22 and 24 and includes a generally longitudinally extending handle 92. As described in greater detail in U.S. Pat. No. 4,213,590 granted July 22, 1980 hereby incorporated into the present application by this reference, shaft 90 includes a finger 94 located in an opening 95 in the lock block and which is rigidly connected thereto. This finger is shown in FIG. 5 and includes a first downwardly extending portion 96 and a second upwardly and outwardly extending portion 98. Finger extension 96 has a center line 96a and extension 98 has a center line 98a. Center lines 96a and 98a make an angle of at least 90 degrees. Preferably the angle does not exceed 160 degrees. Rotation of shaft 90 by handle 92 is effective to move lock block 84 rearwardly against the bias of a spring 100 which surrounds a spring shaft 102 which is integral with lock block 84. Shaft 102 may be formed as a single piece with lock block 84, or may be welded thereto. Spring 100 is held in place by a rear wall 104 of lock block 84 and a spring plate 106 held in place by fasteners 108 extending into a transversely extending hitch head rear plate 110.

The cooperating tapered surfaces 68 and 70 on the jaws and 86 and 88 on the lock block reduce any tendency for the lock block to be resisted by friction between these surfaces in movement from closed to open position and visa versa as has been observed to occur in some instances according to the construction in U.S. Pat. No. 4,213,590. Lock block tapered portions 86 and 88 are particularly helpful in this regard.

Furthermore, the tapered surfaces 68, 70 and 86 and 88 tend to reduce the effect of manufacturing tolerances in the formation of the jaws 44 and 46 and in the lock block 84.

Moreover, the tapered surfaces allow for a limited amount of wear in the engaging surfaces 68 and 70 and 86 and 88.

It is thus seen that the cooperating tapered surfaces 68, 70, 86 and 88 of the present invention provide an improved construction over that shown and described by said Ser. No. 015,560.

To complete the description of the hitch head a plurality of transversely extending plates 112 and 114 are provided which are conveniently welded to longitudinally extending plates 16, 20, 18 and 22 and regarding transverse plate 112 to longitudinal plates 19 and 21.

The operation is basically similar to that in U.S. Pat. No. 4,213,590 referred to above.

Figure 1:
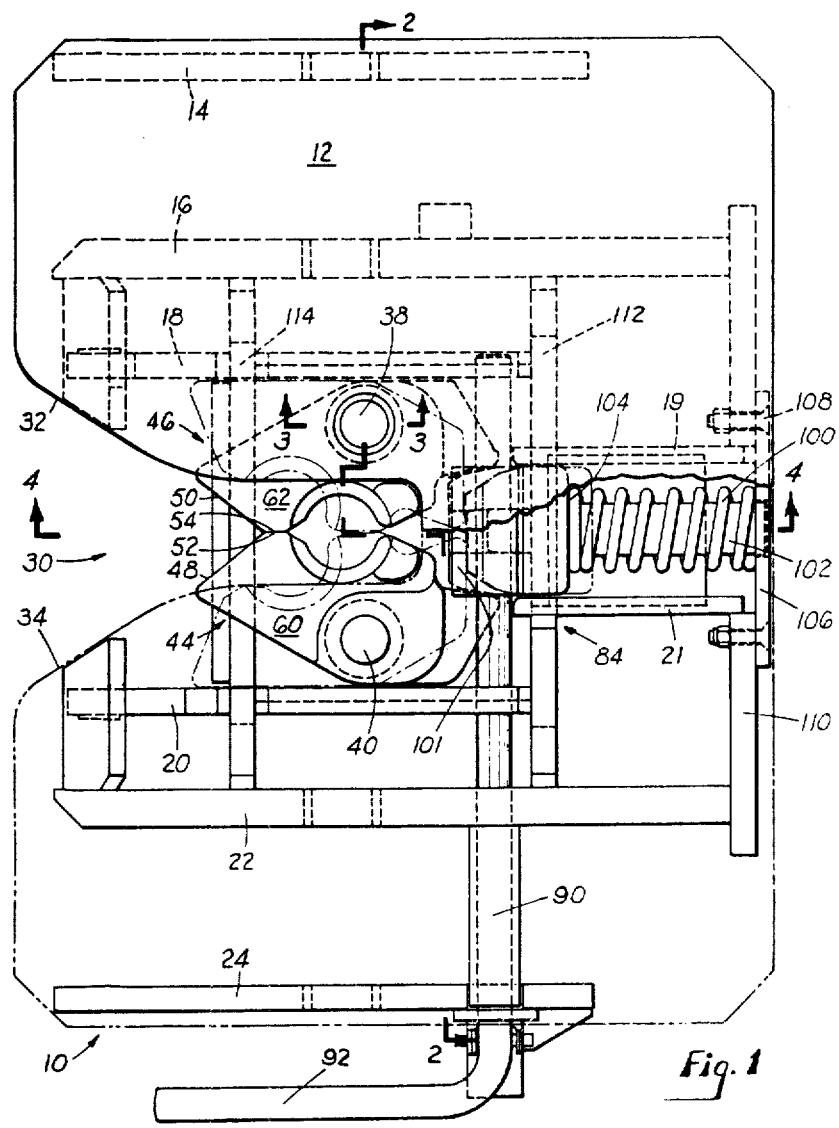
FIG. 1 is a plan view of the jaw interlock arrangement of the present invention.
Figure 1A:
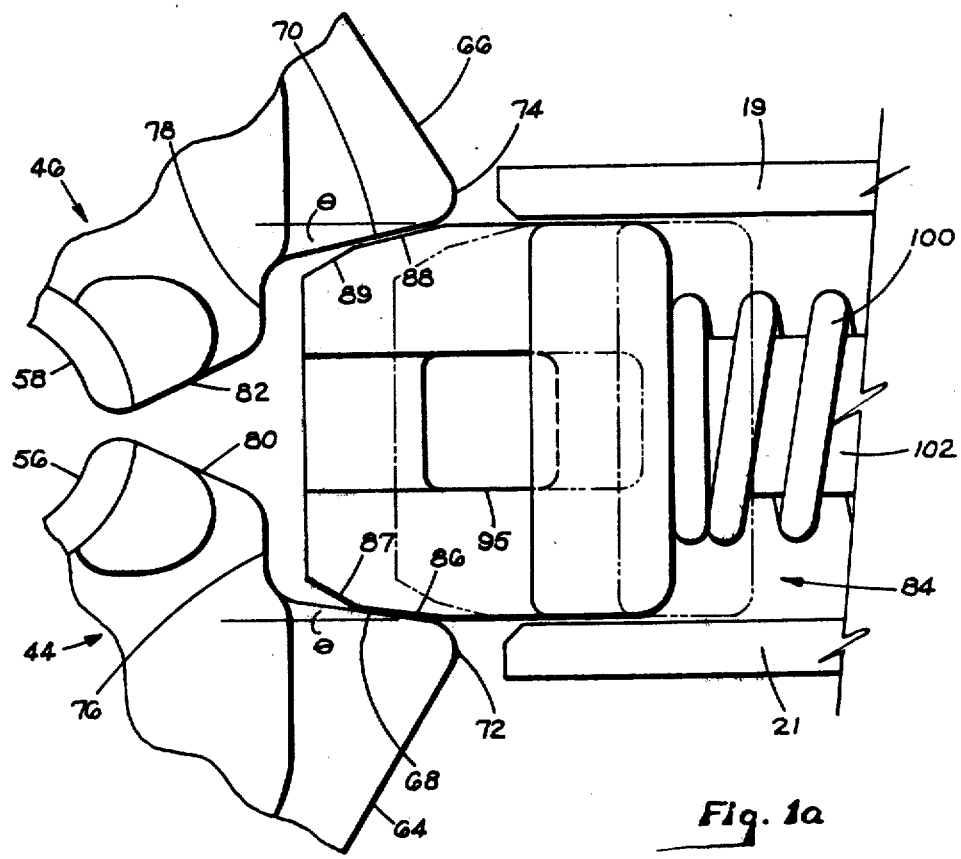
FIG. 1a is an enlarged view of a portion of FIG. 1 with the top plate removed.
Figure 2:
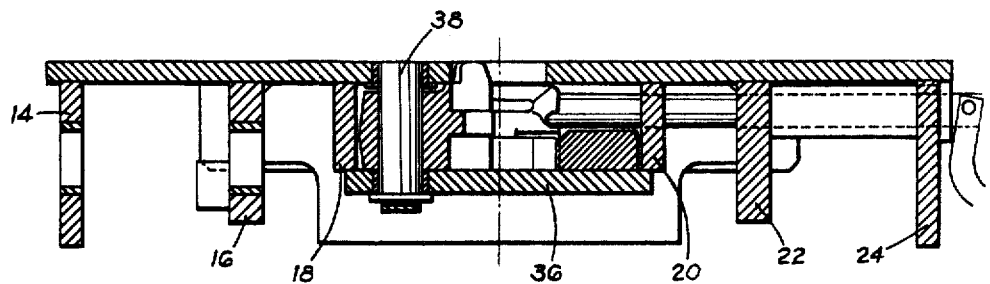
FIG. 2 is an end elevation view looking in the direction of the arrows 2—2 in FIG. 1.
Figure 4:
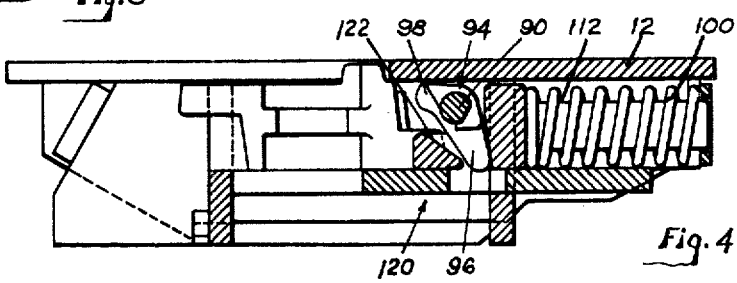
FIG. 4 is a sectional view looking in the direction of the arrows 4—4 in FIG. 1.

Finger 94 includes a generally vertically extending extrusion or protrusion 96 (FIG. 4) which extends upwardly through opening 95 and engages lock block 84. Extension 96 moves lock block 84 rearwardly against the bias of spring 100 to the over-center position shown in phantom lines in FIG. 1a by actuation of operating handle 92 and shaft 90. However, movement of the lock block 30 to the rearward position does not open the jaws. The jaws are opened as the kingpin engages arcuate portion of the jaws 56 and 58 during exit and pivots the jaws about pins 38 and 40. The trailer may be removed by a tractor or an overhead crane according to conventional techniques.

Figure 6:
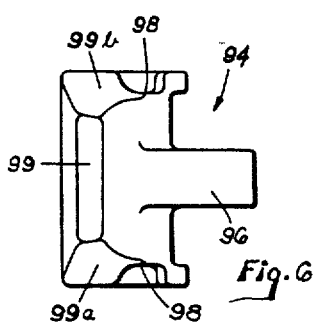
FIG. 6 is a side elevation view of the finger illustrated in FIG. 5 looking in the direction of the arrows 6—6 in FIG. 5.

As the jaws open, the jaws engage second finger extension 98 located upon the finger 94. As shown in FIGS. 5 and 6 the extension 98 is laterally extending between the respective jaws 44 and 46. Extension 98 includes a depending cam surface 99 having end tapered portions 99a and 99b. When the jaw lugs 72 and 74 engage the protrusion 98, the finger 94 is pivoted from the over-center position shown in phantom in FIG. 1a, which enables the locking member 30 to move under the bias of the spring 32 into an engaged position with the rear jaw surfaces 64 and 66 as shown in dotted lines in FIG. 1. The jaws then remain in this open position until another trailer kingpin enters the jaws and the arcuate portions 56 and 58 of the jaws and pivots the jaw to a closed and locked position. At the same time lock block 84 again assumes a closed, engaged position between the jaws, engaging the jaws at 68 and 70 as shown in solid lines in FIG. 1.

It will be noted that the jaws 44 and 46 do not contain torsion springs as were provided in application U.S. Pat. No. 4,213,590. Since the jaws are not biased to open position by such torsion springs, a means according to the present invention is provided to prevent one jaw from assuming the closed position while the other remains in open position. It will be seen in FIGS. 1 and 4 that the lock block includes a front cam portion 120 having an inclined cam surface 122. If one of the jaws 44 or 46, say 44 begins to move to the closed position, in so doing, it must move rearwardly. In so doing, it engages lock block cam 120. Lock block cam surface 122 will in turn engage first extension 96 of finger 94. It will be recalled that the finger extension 98 extends a significant distance transversely beyond the opening 95 in the lock block. This in turn pivots the finger and rotates shaft 90 whereby second extension 98 will engage rear surface 66 of the opposite jaw 46. The location of this external surface 66 prevents further rotation of the finger 94. This stops further movement of the lock block 84 and the lock block prevents further movement of the first jaw (44). The process is reversed if jaw 46 tries to move to closed position.

It is also within the scope of the present invention for the moving jaw to directly engage finger extension 96 to rotate the finger and cause protrusion 98 to engage the outer jaw and prevent it from rotating. For instance, this may be done by providing a slot 101 in the front portion of lock block 84 shown dotted in FIG. 1.

Other modifications will be apparent to those skilled in the hitch and fifth wheel art.

It is seen that with the dual extension fingers and jaw interlock arrangement of the present invention, the torsion springs utilized in application U.S. Pat. No. 4,213,590 which maintain the jaws in open position can be eliminated. Thus the problem of the torsion springs breaking or becoming inoperative and thus requiring the hitch to be taken out of revenue service to dismantle the hitch head and repair or replace the spring is avoided. Thus with the arrangement of the present invention, the hitch head is more maintenance-free, and less lost revenue time is incurred.

What is claimed is:

1. A hitch head or fifth wheel comprising: a pair of pivotable jaws adapted to hold in place a kingpin of a highway trailer; a horizontally movable lock block, said lock block biased by resilient means to a closed position engaging the jaws and holding said jaws in closed position; said jaws adapted to maintain the kingpin in place; said lock block being movable to an open position by a finger engaging the lock block; said finger integrally connected to a horizontally extending operating shaft; said finger comprising a body portion surrounding said shaft; a first finger extension extending in a first radial direction from said body portion, and a second finger extension extending in a second radial direction from said body portion; whereby said jaws are movable to an open position upon exit of the kingpin; the rear portion of each of said jaws having a rear surface, whereby if one of said jaws begins to move from open position toward closed position and the other jaw does not, the rear surface on said one jaw will activate said first finger extension and pivot said finger sufficiently that said second finger extension will engage the rear surface on the other jaw, thereby preventing further rearward movement of said lock block and said lock block preventing said first jaw from moving further toward the closed position.

2. A hitch head or fifth wheel according to claim 1, wherein said lock block includes a front cam portion which said one jaw engages; said cam portion engaging said first finger extension to pivot said finger whereby said second finger extension engages said other jaw.

3. A hitch head or fifth wheel according to claim 1, wherein said one jaw engages said first finger extension to pivot said finger, whereby said second finger extension engages said other jaw.

4. A hitch head or fifth wheel according to claim 1, wherein said operating shaft is rotatable to move said finger to an overcenter position holding the lock block in open position.

5. A hitch head or fifth wheel according to claim 4, wherein said finger second extension comprises a transversely extending protrusion which is engaged by said jaws as the kingpin exits to pivot the finger from said overcenter position, thereby allowing the lock block to move to a position engaging the rear portion of the jaws, holding said jaws open until another kingpin enters said jaws and pivots them to closed position.

6. A hitch head or fifth wheel according to claim 5, wherein said first extension and said second extension each have a center line and wherein said center lines make an angle of at least ninety (90) degrees.

7. A hitch head or fifth wheel according to claim 6, wherein said angle does not exceed one hundred sixty (160) degrees.

8. A hitch head or fifth wheel comprising: a pair of pivotable jaws adapted to hold in place a kingpin of a highway trailer; a horizontally movable lock block having a front cam portion; said lock block biased by resilient means to a closed position engaging the jaws and holding said jaws in closed position; in closed position said jaws adapted to maintain the kingpin in place; said lock block being movable to an open position by a finger engaging the lock block; said finger integrally connected to a horizontally extending operating shaft; said finger comprising a body portion surrounding said shaft; a first finger extension extending in a first radial direction from said body portion, and a second finger extension extending in a second radial direction from said body portion; the rear portion of each of said jaws having a rear surface, whereby if one of said jaws begins to move from open toward closed position and the other jaw does not, the rear surface on said one jaw will engage said front cam portion and said lock block will engage said first finger extension and pivot said finger sufficiently that said second finger extension will engage the rear surface on the other jaw, thereby preventing further rearward movement of said lock block and whereby said lock block prevents said first jaw from moving further toward closed position.

9. A hitch head or fifth wheel according to claim 8, wherein said horizontally extending operating shaft is rotatable to move the finger to an overcenter position holding the lock block in open position.

10. A hitch head or fifth wheel according to claim 9, wherein said second finger extension comprises a transversely extending protrusion which is engaged by said jaws as the kingpin exits to pivot the finger from said overcenter position, thereby allowing the lock block to move to a position engaging the rear portion of the jaws, holding said jaws open until another kingpin enters said jaws and pivots them to closed position.

11. A hitch head or fifth wheel according to claim 10, wherein said first extension and said second extension each have a center line and wherein said center lines make an angle of at least ninety (90) degrees.

12. A hitch head or fifth wheel according to claim 11, wherein said angle does not exceed one hundred sixty (160) degrees.

13. A hitch head or fifth wheel comprising: a pair of pivotable jaws adapted to hold in place a kingpin of a highway trailer; a horizontally movable lock block having a front slot; said lock block biased by resilient means to a closed position engaging the jaws and holding said jaws in closed position; in closed position said jaws adapted to maintain the kingpin in place; said lock block being movable to an open position by a finger engaging the lock block; said finger integrally connected to a horizontally extending operating shaft; said finger comprising a body portion surrounding said shaft; a first finger extension extending in a first radial direction from said body portion, and a second finger extension extending in a second radial direction from said body portion; the rear portion of each of said jaws having a rear surface, whereby if one of said jaws begins to move from open toward closed position and the other jaw does not, the rear surface on the one jaw will extend through said slot and engage said first finger extension and pivot said finger sufficiently that said second finger extension will engage the rear surface on the other jaw and prevent said lock block from moving further rearward; said lock block preventing said first jaw from moving further toward closed position.

14. A hitch head or fifth wheel according to claim 13, wherein said horizontally extending operating shaft is rotatable to move the finger to an overcenter position holding the lock block in open position.

15. A hitch head or fifth wheel according to claim 13, wherein said second finger extension comprises a transversely extending protrusion which is engaged by said jaws as the kingpin exits to pivot the finger from said overcenter position, thereby allowing the lock block to move to a position engaging the rear portion of the jaws, holding said jaws open until another kingpin enters said jaws and pivots them to closed position.

16. A hitch head or fifth wheel according to claim 15, wherein said first extension and said second extension each have a center line and wherein said center lines make an angle of at least ninety (90) degrees.

17. A hitch head or fifth wheel according to claim 16, wherein said angle does not exceed one hundred sixty (160) degrees.

* * * * *